(12) United States Patent
Katada et al.

(10) Patent No.: US 9,047,888 B2
(45) Date of Patent: Jun. 2, 2015

(54) MAMR HEAD ADAPTED FOR HIGH SPEED SWITCHING

(71) Applicant: HGST Netherlands B.V., Amsterdam (NL)

(72) Inventors: Hiroyuki Katada, Odawara (JP); Masato Shiimoto, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/723,070

(22) Filed: Dec. 20, 2012

(65) Prior Publication Data

US 2014/0177092 A1    Jun. 26, 2014

(51) Int. Cl.
G11B 5/127    (2006.01)
G11B 5/31    (2006.01)
G11B 5/00    (2006.01)

(52) U.S. Cl.
CPC ........ G11B 5/314 (2013.01); *G11B 2005/0024* (2013.01)

(58) Field of Classification Search
CPC .............................................. G11B 2005/0024
USPC .............. 360/125.3–125.32, 125.71, 125.74, 360/125.75
See application file for complete search history.

(56) References Cited

U.S. PATENT DOCUMENTS

| | | | |
|---|---|---|---|
| 2006/0039089 A1* | 2/2006 | Sato | 360/324 |
| 2010/0195247 A1 | 8/2010 | Mochizuki et al. | |
| 2011/0090603 A1 | 4/2011 | Bai | |
| 2011/0216435 A1* | 9/2011 | Shiimoto et al. | 360/59 |
| 2011/0279921 A1* | 11/2011 | Zhang et al. | 360/59 |
| 2011/0293967 A1 | 12/2011 | Zhang et al. | |
| 2012/0069465 A1 | 3/2012 | Sato et al. | |
| 2012/0113540 A1 | 5/2012 | Zhang et al. | |
| 2012/0113542 A1 | 5/2012 | Igarashi et al. | |
| 2012/0120518 A1 | 5/2012 | Matsubara et al. | |
| 2012/0126905 A1 | 5/2012 | Zhang et al. | |

OTHER PUBLICATIONS

Wang, Yiming, "Physics and Micromagnetic Analysis of Advanced Recording Technologies," Department of Electrical and Computer Engineering, Carnegie Mellon University, Pittsburgh, Pennsylvania, May 2011, pp. 1-122.
Matsubara, M., et al., "Experimental feasibility of spin-torque oscillator with synthetic field generation layer for microwave assisted magnetic recording," Journal of Applied Physics, vol. 109, Issue 7, 2011.
Zhu, J.H., et al., "Microwave Assisted Magnetic Recording," IEEE Transactions on Magnetics, vol. 44, No. 1, Jan. 2008.

* cited by examiner

*Primary Examiner* — Adam B Dravininkas
(74) *Attorney, Agent, or Firm* — Zilka-Kotab, PC

(57) ABSTRACT

A microwave-assisted magnetic recording (MAMR) head according to one embodiment includes a main magnetic pole adapted to generate a writing magnetic field when current is applied to a write coil; a trailing shield positioned, at an air bearing surface (ABS), in a trailing direction from the main magnetic pole; and a field generation layer (FGL) positioned, at the ABS, between the main magnetic pole and the trailing shield, wherein either a portion of the main magnetic pole closer to the FGL or a portion of the trailing shield closer to the FGL is adapted to act as a spin polarization layer.

5 Claims, 19 Drawing Sheets

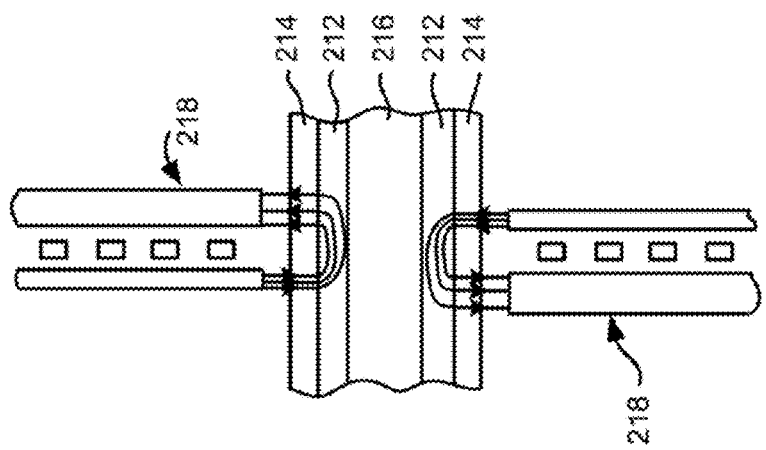
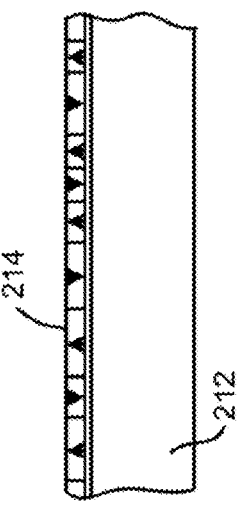
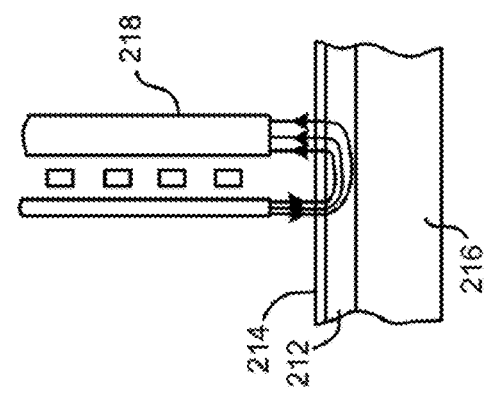
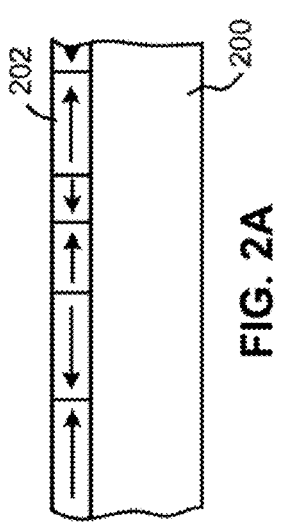
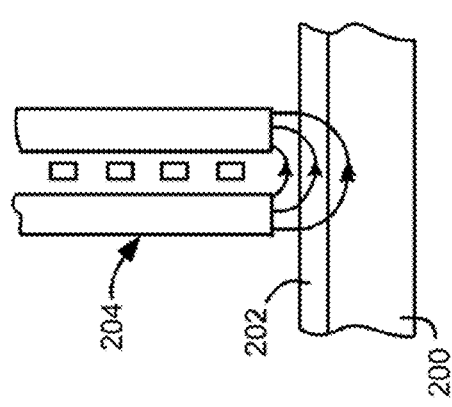

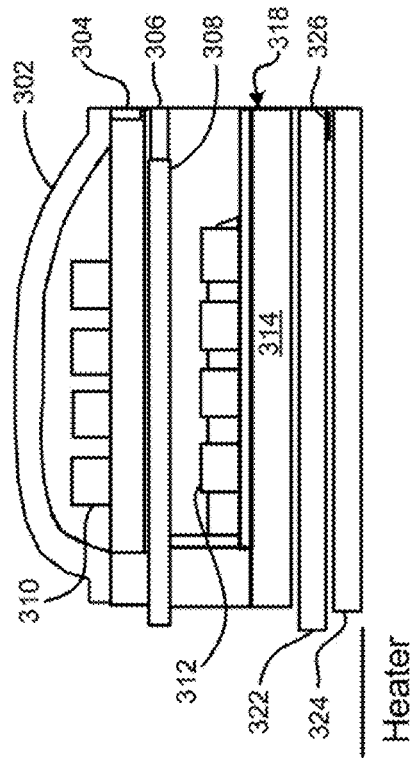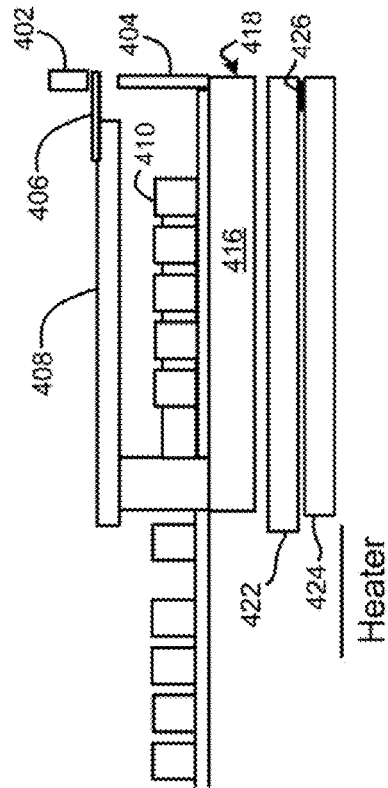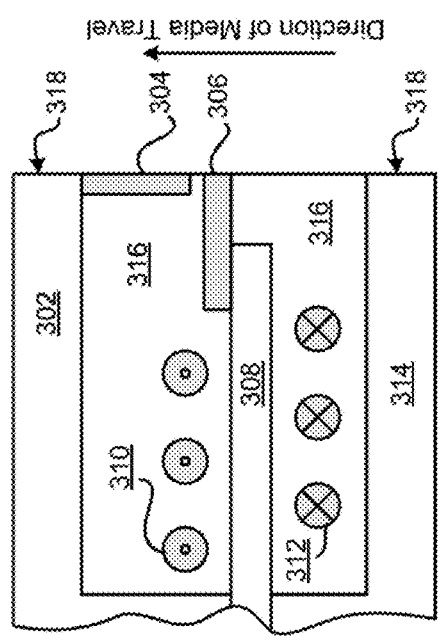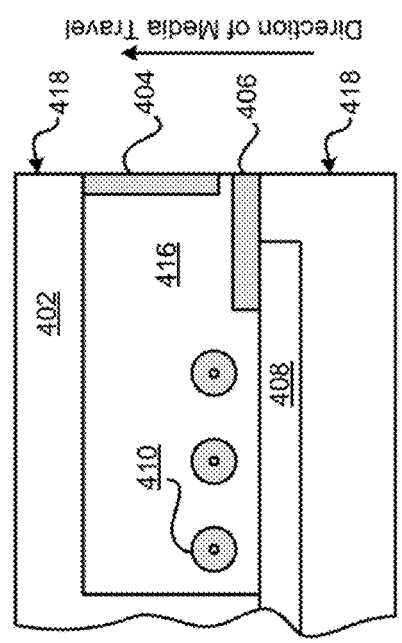

MAMR HEAD ADAPTED FOR HIGH SPEED SWITCHING

FIELD OF THE INVENTION

The present invention relates to data storage systems, and more particularly, this invention relates to a microwave-assisted magnetic recording head that does not have a spin polarization layer for high speed switching.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. The development of microwave-assisted magnetic recording (MAMR) systems for enhancing the surface density of magnetic recording media has benefited higher density recording. In MAMR, in addition to a writing magnetic field emitted by a main magnetic pole, an alternating current (AC) magnetic field is applied to a recording medium from a spin torque oscillator (STO). Because the coercivity of a recording medium drops when an AC magnetic field is applied thereto, this renders high-quality recording more easily obtainable.

The STO is arranged between the main magnetic pole and a trailing shield. A conventional STO structure is typically comprised of the following layers: a main magnetic pole/spin-polarization layer/non-magnetic interlayer/oscillation layer/non-magnetic cap layer/trailing shield. In other conventional structures, an STO may be defined by a main magnetic pole/non-magnetic layer/oscillation layer/non-magnetic interlayer/spin polarization layer/trailing shield.

The spin polarization layer possesses magnetic anisotropy in the direction perpendicular to a film surface of the STO. The spin polarization layer is chosen such that when an electric current flows to the STO, the electron spin produced by the spin polarization layer has the same orientation as the spin polarization layer. These electrons impart a torque ("spin torque") to the magnetization of the oscillation layer and, as a result, a magnetization rotation of the oscillation layer occurs. This magnetization rotation of the oscillation layer forms an AC magnetic field which is emitted by the STO.

There are some inherent problems with the use of recording heads having a conventional STO structure. On such problem is that while the writing magnetic field gradient is increased to produce a high signal-to-noise ratio (SNR), this typically necessitates a narrowing of the gap distance between the main magnetic pole and the trailing shield. However, the existence of the STO renders a narrowing of the gap to a width equivalent to or less than the STO film thickness problematic or impossible. When the writing magnetic field generated from the main magnetic pole is low, even if the recording is assisted by an AC magnetic field from the STO, the noise of the recorded signal pattern is increased and the SNR is lowered.

Another typical problem common to MAMR systems involves the reversal of the magnetic field polarity. Simultaneously with the reversal of the magnetic field polarity from the main magnetic pole to match the polarity of the recording bits, the magnetization direction of the spin polarization layer is reversed in typical MAMR systems. Because the STO is provided in the gap between the main magnetic pole and the trailing shield, the magnetization reversal of the spin polarization layer is produced by the magnetic field generated from the main magnetic pole. Accordingly, when the polarity of the recording bits is altered, the recording is performed in the sequence of main magnetic pole magnetization polarity reversal, spin polarization layer magnetization polarity reversal, and oscillation layer magnetization oscillation. As a result, following the completion of the main magnetic pole polarity reversal, there is a time delay until the oscillation layer magnetization attains stable oscillation. This results in a delay in the AC magnetic field generated by the STO with respect to the writing magnetic field generated by the main magnetic pole, which acts to preclude adequate recording assistance from occurring in the vicinity of the location of transition, and acts to preclude the production of a high SNR. Accordingly, in conventional MAMR systems, the higher the transfer rate during recording, the longer the relative time delay becomes.

Therefore, it would be beneficial to have a MAMR system which overcomes the problems associated with conventional MAMR systems.

SUMMARY

A microwave-assisted magnetic recording (MAMR) head according to one embodiment includes a main magnetic pole adapted to generate a writing magnetic field when current is applied to a write coil; a trailing shield positioned, at an air bearing surface (ABS), in a trailing direction from the main magnetic pole; and a field generation layer (FGL) positioned, at the ABS, between the main magnetic pole and the trailing shield, wherein either a portion of the main magnetic pole closer to the FGL or a portion of the trailing shield closer to the FGL is adapted to act as a spin polarization layer.

A method for forming a microwave-assisted magnetic recording (MAMR) head according to one embodiment includes forming a main magnetic pole above a substrate, the main magnetic pole being adapted to generate a writing magnetic field when current is applied to a write coil; forming a field generation layer (FGL) above the main magnetic pole, the FGL being adapted to generate a high-frequency magnetic field when current is applied thereto, and forming a trailing shield above the FGL, wherein either a portion of the main magnetic pole closer to the FGL or a portion of the trailing shield closer to the FGL is defined to act as a spin polarization layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a microwave-assisted magnetic recording (MAMR) head includes a main magnetic pole adapted to generate a writing magnetic field when current is applied to a write coil; a trailing shield positioned, at an air bearing surface (ABS), in a trailing direction from the main magnetic pole; and a field generation layer (FGL) positioned, at the ABS, between the main magnetic pole and the trailing shield, wherein either a portion of the main magnetic pole closer to the FGL or a portion of the trailing shield closer to the FGL is adapted to act as a spin polarization layer.

In one general embodiment, a method for forming a microwave-assisted magnetic recording (MAMR) head includes forming a main magnetic pole above a substrate, the main magnetic pole being adapted to generate a writing magnetic field when current is applied to a write coil; forming a field generation layer (FGL) above the main magnetic pole, the FGL being adapted to generate a high-frequency magnetic field when current is applied thereto; and forming a trailing shield above the FGL, wherein either a portion of the main magnetic pole closer to the FGL or a portion of the trailing shield closer to the FGL is defined to act as a spin polarization layer.

Figure 1:
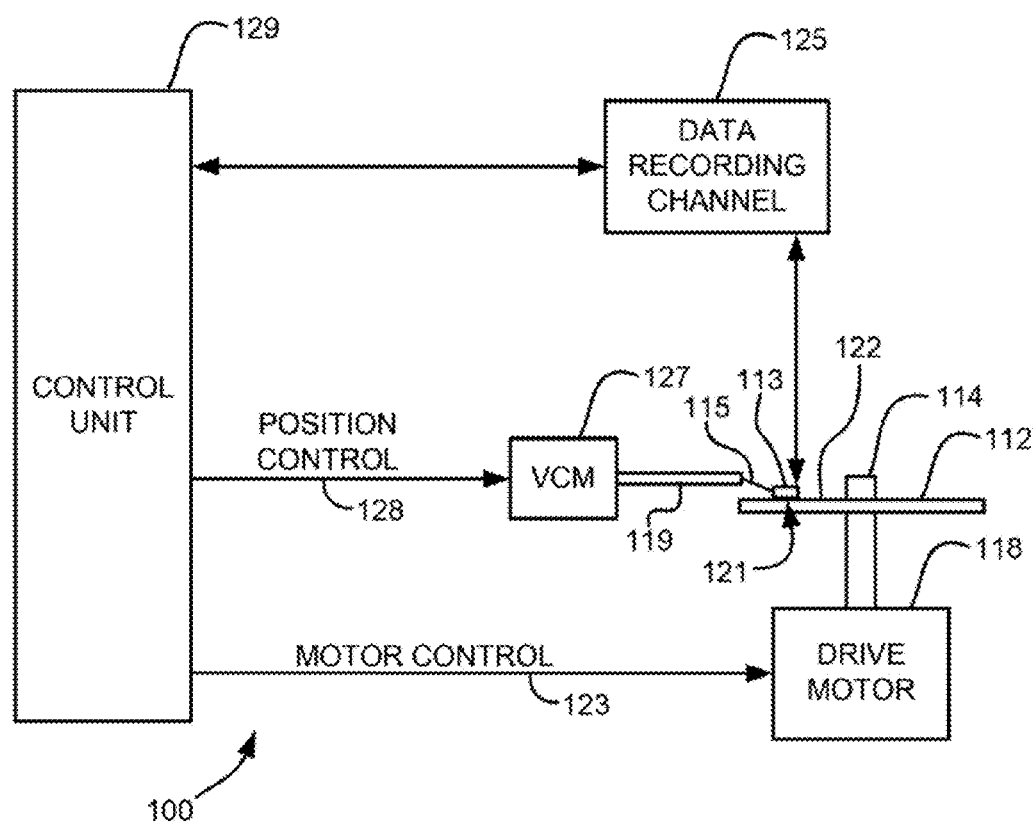
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 (write coils) are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5A:
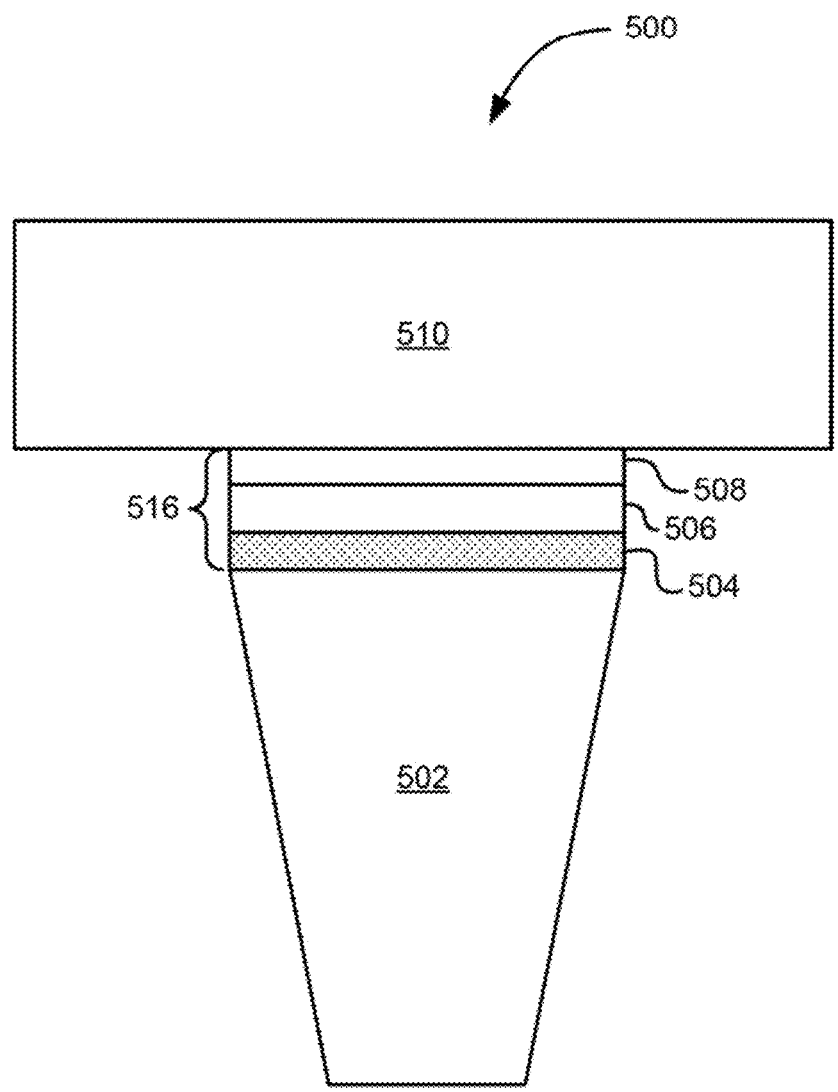
FIG. 5A shows an air bearing surface (ABS) view of one embodiment of a microwave-assisted magnetic recording (MAMR) head.

In FIG. 5A, a magnetic recording head 500 is shown from an air bearing surface (ABS) thereof, according to one embodiment. In FIG. 5C, a cross-sectional view of the magnetic recording head 500 of FIG. 5A is shown, according to one embodiment. As shown in FIGS. 5A and 5C, the magnetic recording head 500 utilizes microwave-assisted magnetic recording (MAMR) and includes a main magnetic pole (main pole) 502, an interlayer 504 above the main pole 502, a field generation layer (FGL) 506 above the interlayer 504, a cap layer 508 above the FGL 506, and a trailing shield 510 above the cap layer 508. The cap layer 508 and/or the interlayer 504 may comprise a non-magnetic material, such as Cu, Ag, Al, Ru, alumina, MgO, etc. In one approach, the cap layer 508 and the interlayer 504 are only formed of non-magnetic material, e.g., no magnetic material is included in the layers. The main magnetic pole 502 is adapted to generate a writing magnetic field when current is applied to a write coil, and the FGL 506 is adapted to generate a high-frequency magnetic field when current is applied thereto. This high-frequency magnetic field aids in writing to magnetic media when used in conjunction with the writing magnetic field. In addition, in this structure, a portion of the main magnetic pole 502 closer to the FGL 506 is adapted to act as a spin polarization layer.

In this way, a spin torque oscillator (STO) 516 is formed of at least a portion of one or more of: the main pole 502, the interlayer 504, the FGL 506, and the cap layer 508. As a result of the flow of flux from the main pole 502 in the direction of the trailing shield 510, a magnetization of the trailing shield 510 in a vicinity of the region thereof facing the FGL 506 and the magnetization of the main pole 502 at the region thereof facing the FGL 506 is automatically fixed in a direction that approximates a direction perpendicular to the FGL 506. This affords a functional equivalent to that of a spin polarization layer (which is omitted from these structures), and allows for oscillation to be produced in the absence of the inclusion of a spin polarization layer.

Figure 5B:
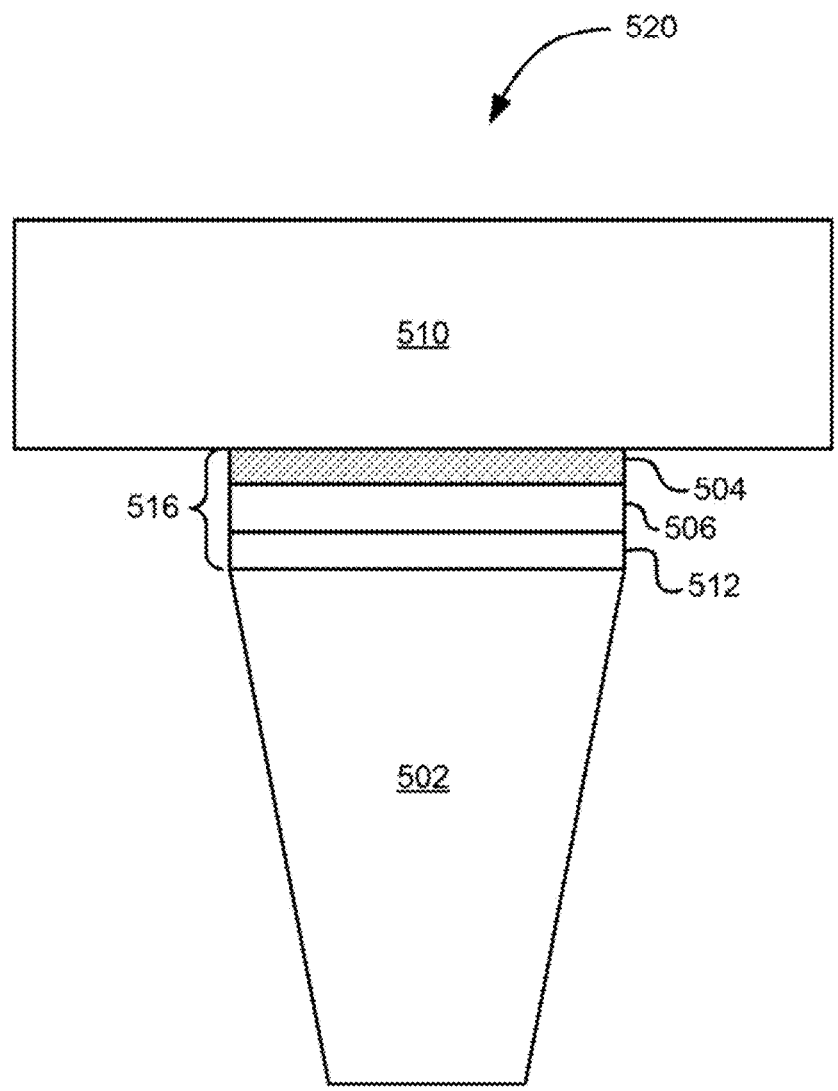
FIG. 5B shows a cross-sectional view of the MAMR head from FIG. 5A, according to one embodiment.
Figure 5C:
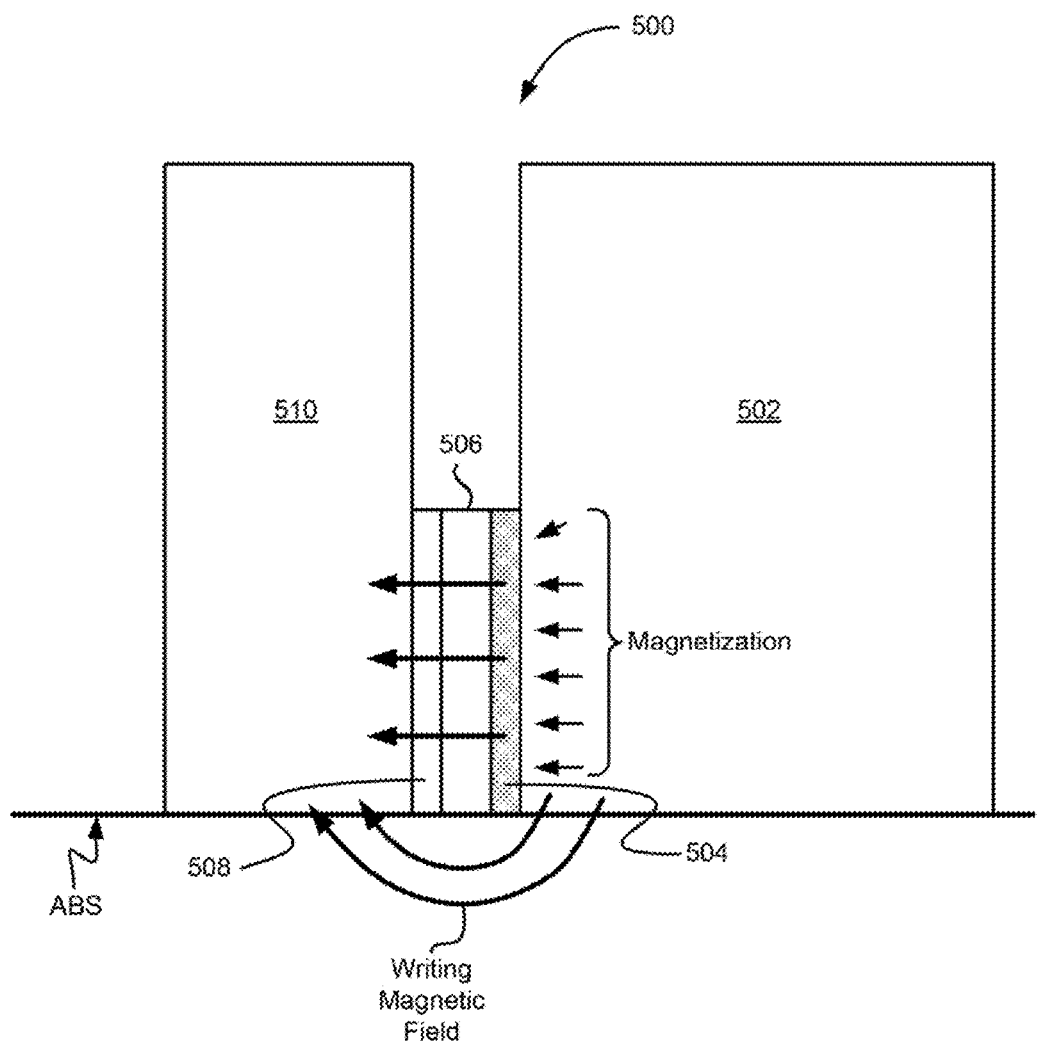
FIG. 5C shows an ABS view of one embodiment of a MAMR head.
Figure 5D:
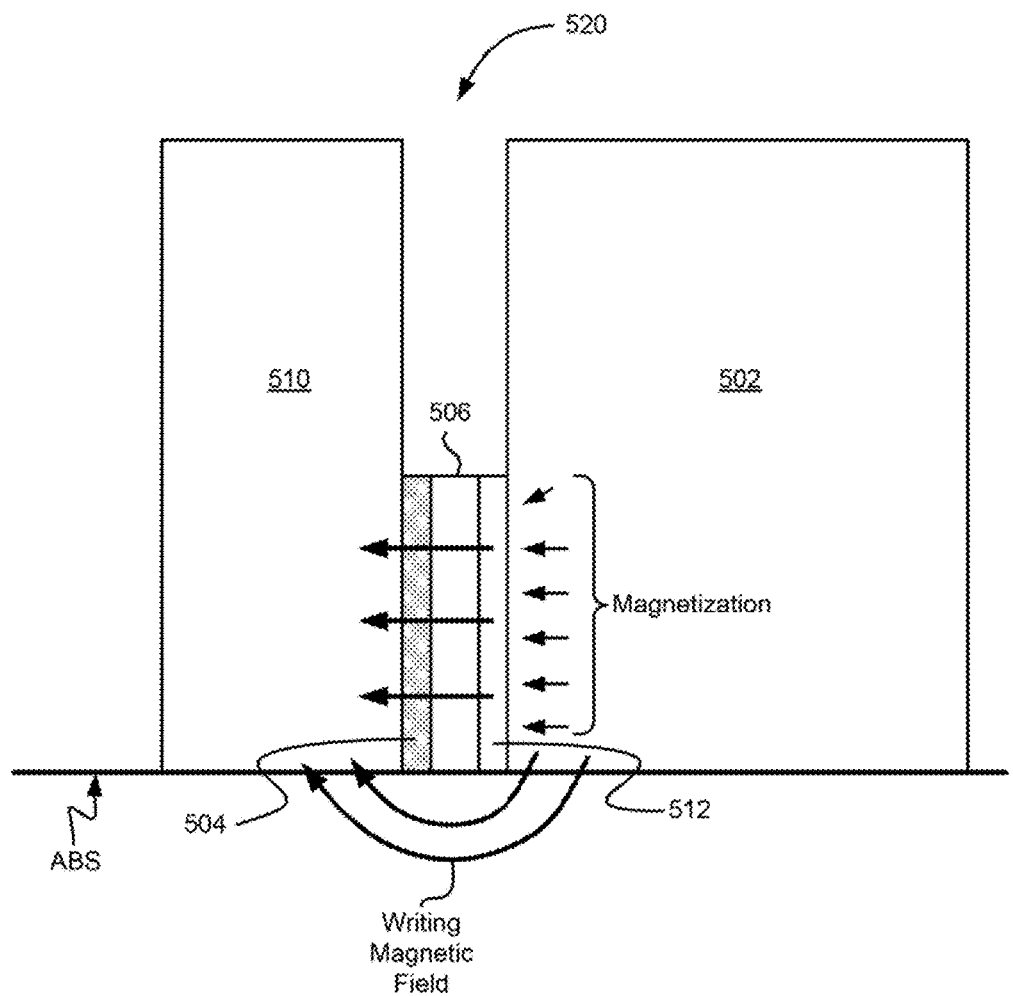
FIG. 5D shows a cross-sectional view of the MAMR head from FIG. 5C, according to one embodiment.

In FIG. 5B, a magnetic recording head 520 is shown from an ABS thereof, according to one embodiment. In FIG. 5D, a cross-sectional view of the magnetic recording head 520 of FIG. 5B is shown, according to one embodiment. As shown in FIGS. 5B and 5D, the MAMR head 520 may include a main pole 502, a spacer layer 512 above the main pole 502, a FGL 506 above the spacer layer 512, an interlayer 504 above the FGL 506, and a trailing shield 510 above the interlayer 504. The spacer layer 512 and/or the interlayer 504 may comprise a non-magnetic material, such as Cu, Ag, Al, Ru, alumina, MgO, etc. The main magnetic pole 502 is adapted to generate a writing magnetic field when current is applied to a write coil, and the FGL 506 is adapted to generate a high-frequency magnetic field when current is applied thereto. This high-frequency magnetic field aids in writing to magnetic media when used in conjunction with the writing magnetic field. In addition, in this structure, a portion of the trailing shield 510 closer to the FGL 506 is adapted to act as a spin polarization layer.

In this way, a STO 516 is formed of at least a portion of one or more of: the interlayer 504, the FGL 506, the spacer layer 512, and the trailing shield 510. Also, when a magnetic field is generated from the main pole 502, magnetization of a portion of the trailing shield 510 closest to the STO 516 is fixed in the perpendicular direction with respect to a film surface of the trailing shield 510 facing the STO 516. As a result, the magnetization of this portion of the trailing shield 510 fulfills a role equivalent to that of a magnetization of the spin polarization layer of a conventional structure, wherein the magnetization of the FGL 506 is rotated by the spin torque and an AC magnetic field is generated.

Accordingly, in the same way as in the MAMR head of FIGS. 5A and 5C, compared to a conventional structure, the magnetic field gradient is increased by the reduction in the gap between the main pole 502 and the trailing shield 510, and the oscillation time response is improved.

Compared to an STO of a conventional structure, the thickness of the STO 516 in FIGS. 5A-5D is reduced by an amount equivalent to a thickness of a spin polarization layer (which is omitted). Accordingly, the MAMR head 500, 520, according to various embodiments, affords a narrower trailing gap. As a result, the magnetic field gradient generated from the main magnetic pole 502 increases, and the SNR of the recording pattern is improved.

In addition, in the MAMR head 500, 520, when the polarity of the recording bits is altered, assisted recording is performed in the sequence of main pole 502 magnetization polarity reversal, and FGL 506 magnetization oscillation. As a result, compared to a conventional structure, the time required for magnetization polarity reversal of the spin polarization layer is eliminated and, in the case of high transfer rates in particular, this affords a higher SNR as compared to conventional structures.

According to another embodiment, a portion of the trailing shield 510 closer to the FGL 506 and a portion of the main magnetic pole 502 closer to the FGL 506 may be adapted to act as components of a spin polarization layer, e.g., together they act as a spin polarization layer, as understood in the art.

Figure 6A:
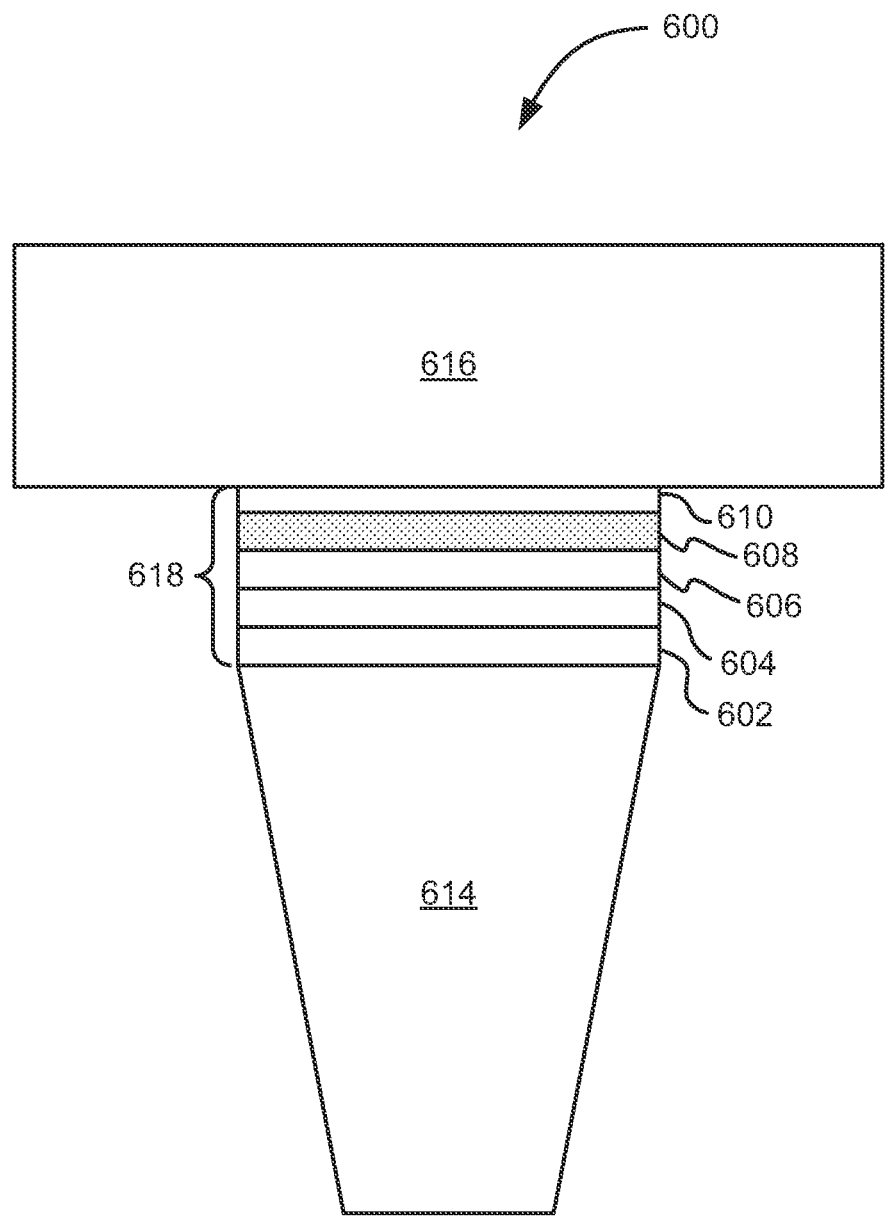
FIG. 6A shows an ABS view of a conventional MAMR head.
Figure 6B:
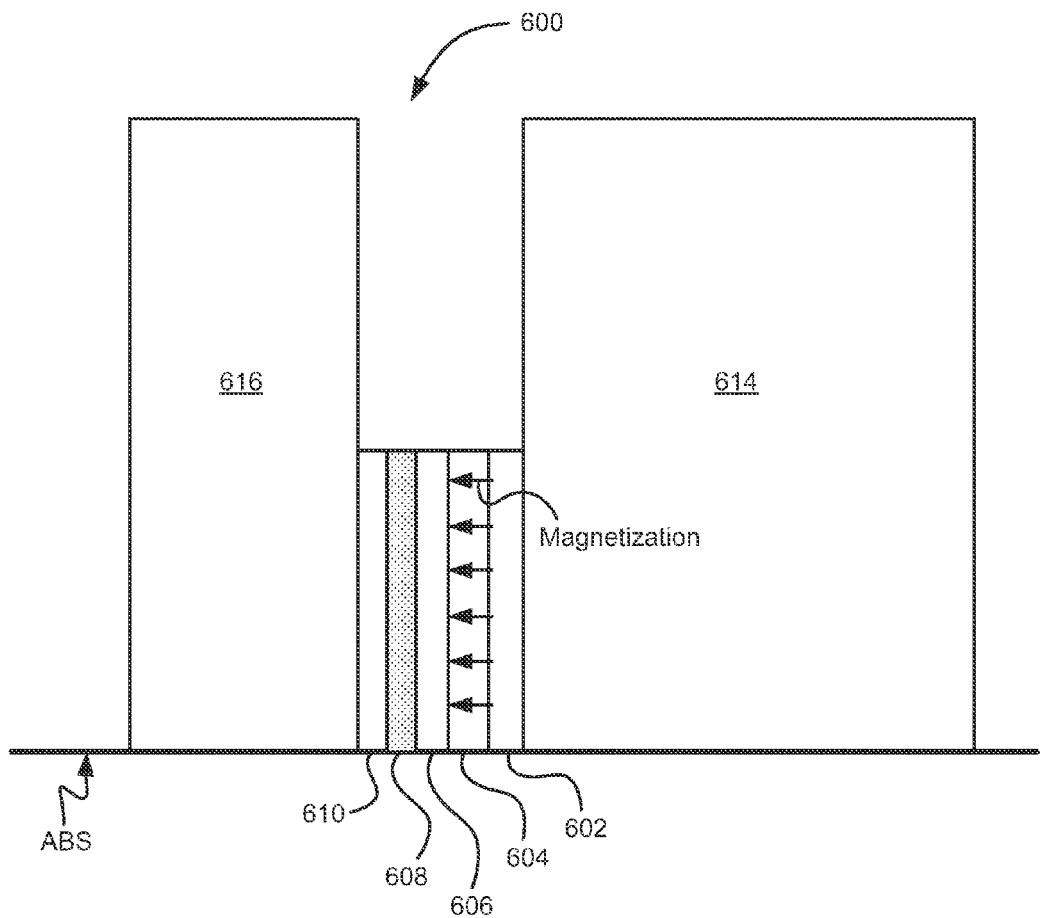
FIG. 6B shows a cross-sectional view of the MAMR head from FIG. 6A.

A STO 618 in a conventional structure 600 is shown in FIGS. 6A-6B, with FIG. 6A showing an ABS view, and FIG. 6B showing a cross-sectional view. The STO 618 in the conventional structure 600 is defined by an underlayer 602/a spin polarization layer 604/a non-magnetic interlayer 606/an oscillation layer 608/a non-magnetic cap layer 610. In one exemplary conventional structure, Ta (film thickness 5 nm) was employed as the underlayer 602, CoNi (Ms 1000 emu/cm$^3$, Hk 17 kOe, film thickness 6 nm) having magnetic anisotropy in a direction perpendicular to a film surface was employed as the spin polarization layer 604, Cu (film thickness 3 nm) was employed as the non-magnetic interlayer 606, CoFe (film thickness 10 nm) was employed as the oscillation layer 608, and NiCr/Ta/Ru (film thickness 6 nm) was employed as the non-magnetic cap layer 610. In an alternate exemplary conventional structure, the non-magnetic cap layer 610 may be replaced with a magnetic rotation guide layer having magnetic anisotropy in the direction perpendicular to the film surface, or a laminate of a magnetic rotation guide layer and a non-magnetic cap layer 610 may be employed. In this exemplary conventional structure 600, the gap between the main pole 614 and the trailing shield 616, which is the principal factor in determining the magnetic field gradient of the magnetic field generated from the main pole 614, is about 30 nm, and is equivalent to the total film thickness of the STO 618.

On the other hand, the STO 516 of the MAMR head 500 in FIGS. 5A and 5C, and according to one embodiment, is defined by an interlayer 504/a FGL 506/a cap layer 508. In one example, Cu (film thickness about 3 nm) may be employed as the interlayer 504, CoFe (film thickness about 10 nm) may be employed as the FGL 506, and NiCr/Ta/Ru (film thickness about 6 nm) may be employed as the cap layer 508. The cap layer 508 may be replaced with a magnetic rotation guide layer (not shown) having magnetic anisotropy in a direction perpendicular to the film surface according to one embodiment. In another embodiment, a laminate of a magnetic rotation guide layer and a non-magnetic cap layer may be employed. In this exemplary MAMR head 500, a gap between the main pole 502 and the trailing shield 510 is about 19 nm and is equivalent to the total film thickness of the STO 516.

Also in contrast, the STO 516 of the MAMR head 520 in FIGS. 5B and 5D, and according to one embodiment, is defined by a spacer layer 512/a FGL 506/an interlayer 504. In one example, NiCr/Ta/Ru (film thickness about 6 nm) may be employed as the spacer layer 512, CoFe (film thickness about 10 nm) may be employed as the FGL 506, and Cu (film thickness about 3 nm) may be employed as the interlayer 504. The spacer layer 512 may be replaced with a magnetic rotation guide layer (not shown) having magnetic anisotropy in a direction perpendicular to the film surface according to one embodiment. In another embodiment, a laminate of a magnetic rotation guide layer and a non-magnetic spacer layer may be employed. In this exemplary MAMR head 500, a gap between the main pole 502 and the trailing shield 510 is about 19 nm and is equivalent to the total film thickness of the STO 516.

Figure 7:
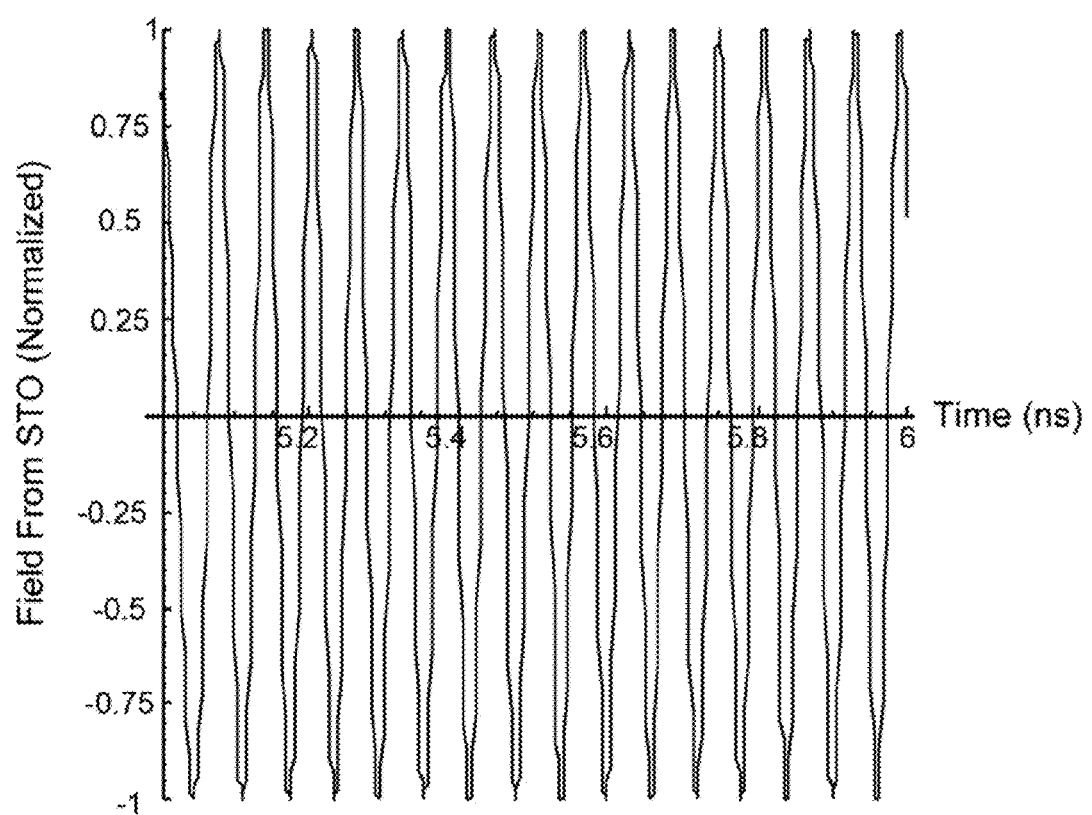
FIG. 7 shows an alternating current (AC) magnetic field generated by a spin torque oscillator (STO) of a MAMR head, according to one embodiment.

FIG. 7 shows time dependence of a magnetic field generated by a STO of a MAMR head, according to one embodiment. Despite the absence of a spin-polarization layer and a layer serving as an underlayer thereof in the structure of the MAMR head, a stable AC magnetic field is able to be produced. A portion of the magnetic field generated from the main pole passes through the STO to be induced by the trailing shield. Accordingly, as shown in FIGS. 5C and 5D, when a magnetic field is generated from the main pole 502, the magnetization of the section of the main pole 502 closest to the STO 516 is fixed in a perpendicular direction to a film surface of the main pole 502 facing the STO 516. Notably, while FIGS. 5C and 5D show a left-facing magnetization, the left/right magnetization direction is altered by the polarity of the main pole 502. Accordingly, the magnetization of the section fixed in the perpendicular direction fulfills a role equivalent to that of the magnetization of a spin polarization layer of a conventional structure, wherein the magnetization of the FGL 506 is rotated by the spin torque, and an AC magnetic field is generated.

Figure 8:
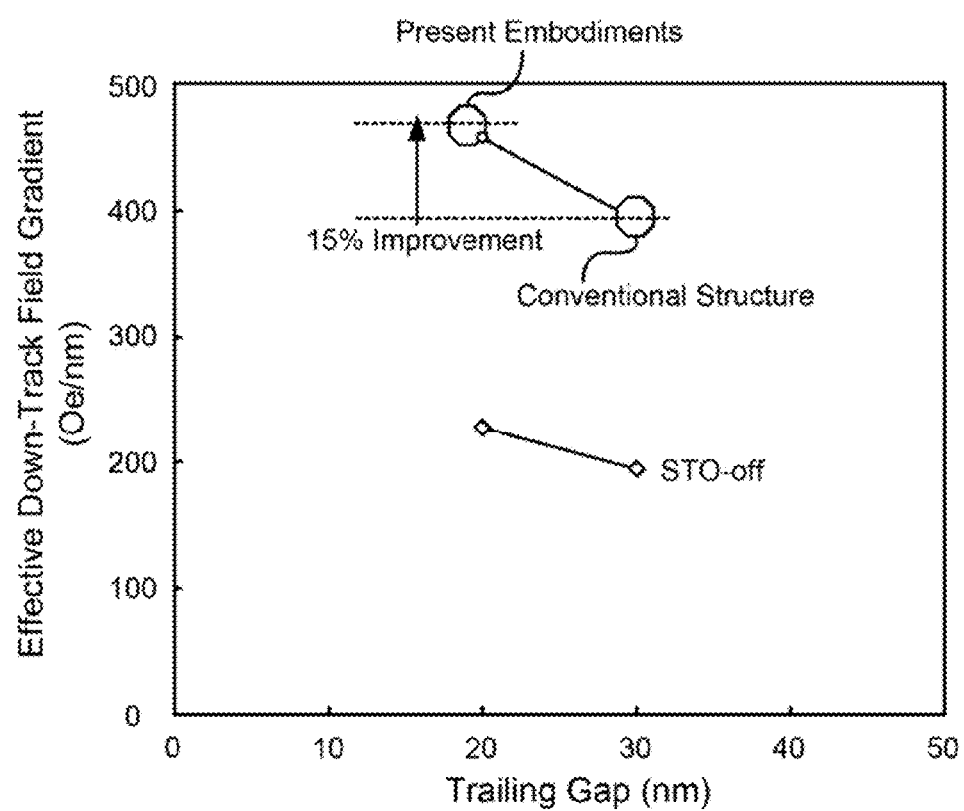
FIG. 8 shows effective magnetic field gradient of a MAMR head according to one embodiment and the conventional structure.

FIG. 8 shows effective head magnetic field gradient of a MAMR head, according to one embodiment, and a conventional structure. Because the gap between the main pole and the trailing shield in the MAMR head, according to one embodiment, is narrower by about 11 nm than in a conventional structure, when current flows to the STO, the effective head magnetic field gradient is improved by approximately 15%. While the SNR gain produced by this improvement in the head magnetic field gradient is dependent upon the medium with which it is combined, when a 1T bit/in$^2$ class medium is employed, as an example, a large gain is able to be produced with an SNR gain of about 1 dB.

Figure 9:
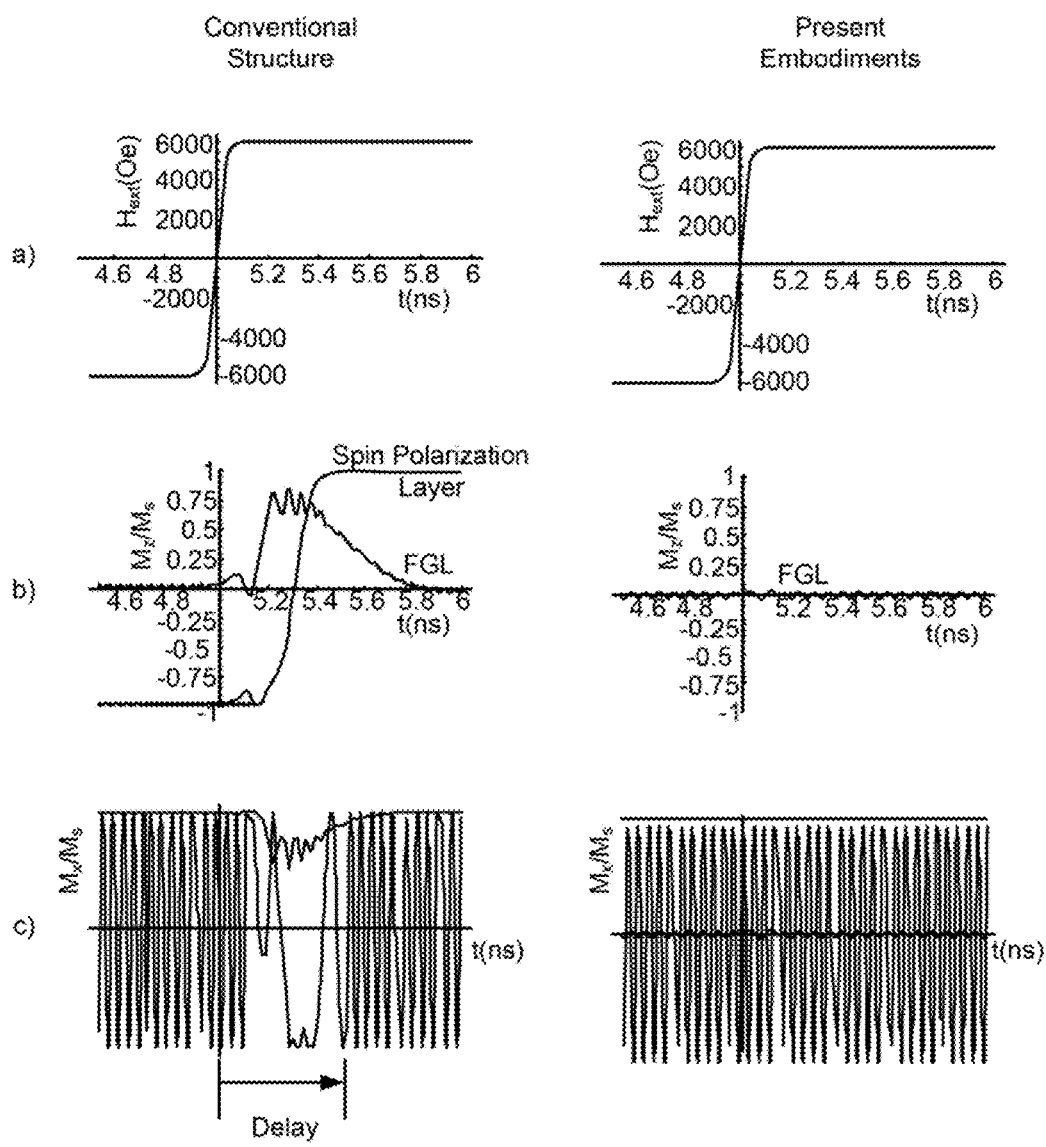
FIG. 9 shows kinetic response during the formation of magnetization transition in a MAMR head according to one embodiment and the conventional structure.

FIG. 9 shows, for a MAMR head 500, 520 of FIGS. 5A-5D, according to one embodiment, and the conventional structure, (a) the time response of the magnetic field ($H_{ext}$) from the main pole measured in Oe over a period of time, (b) the time response of the magnetization component in the direction perpendicular to the film surface ($M_z$) of the spin-polarization layer and the FGL, normalized with respect to the saturation magnetization (e.g., $M_z/M_s$), over a period of time, and (c) the time response of the magnetization component ($M_x$) (corresponding to the in-plane direction component which determines the high-frequency magnetic field) of the spin polarization layer and the FGL, normalized with respect to the saturation magnetization (e.g., $M_x/M_s$), when the polarity of the main pole is reversed over a period of time.

In the conventional structure, following the time delay which accompanies the reversal of the magnetic field of the main pole, the magnetization of the spin polarization layer is reversed, and it is clear that the stable oscillation of the FGL magnetization is produced following the completion of the magnetization reversal of the spin polarization layer, which generates a time delay.

On the other hand, because of the absence of a spin polarization layer in the MAMR heads presented herein according to various embodiments, a stable oscillation is produced in the FGL immediately following the reversal of the magnetic field of the main pole. In the MAMR heads presented herein according to various embodiments, once the reversal of the magnetic field from the main pole has been completed, the reversal of the portion of the main role that performs a function equivalent to that of the spin polarization layer is also completed and, as a result, the generation of a time delay is avoided.

Notably, while FIG. 9 describes an example in which the width of the upper edge of the main pole and the width of the STO are equivalent, because both widths are determined on the basis of the magnitude of the magnetic field generated by the main pole and the magnitude of the AC magnetic field generated by the STO, the width of the upper edge of the main pole may be greater than that of the STO, or the width of the upper edge of the main pole may be less than that of the STO, in various approaches. In addition, an STO for shingled recording may be shifted in the cross-track direction with respect to the main pole, as understood by one of skill in the art. Furthermore, in some approaches, a side shield may be provided on outer sides of the main pole in a track width direction, normal to the direction of media movement across the ABS.

Figure 10A:
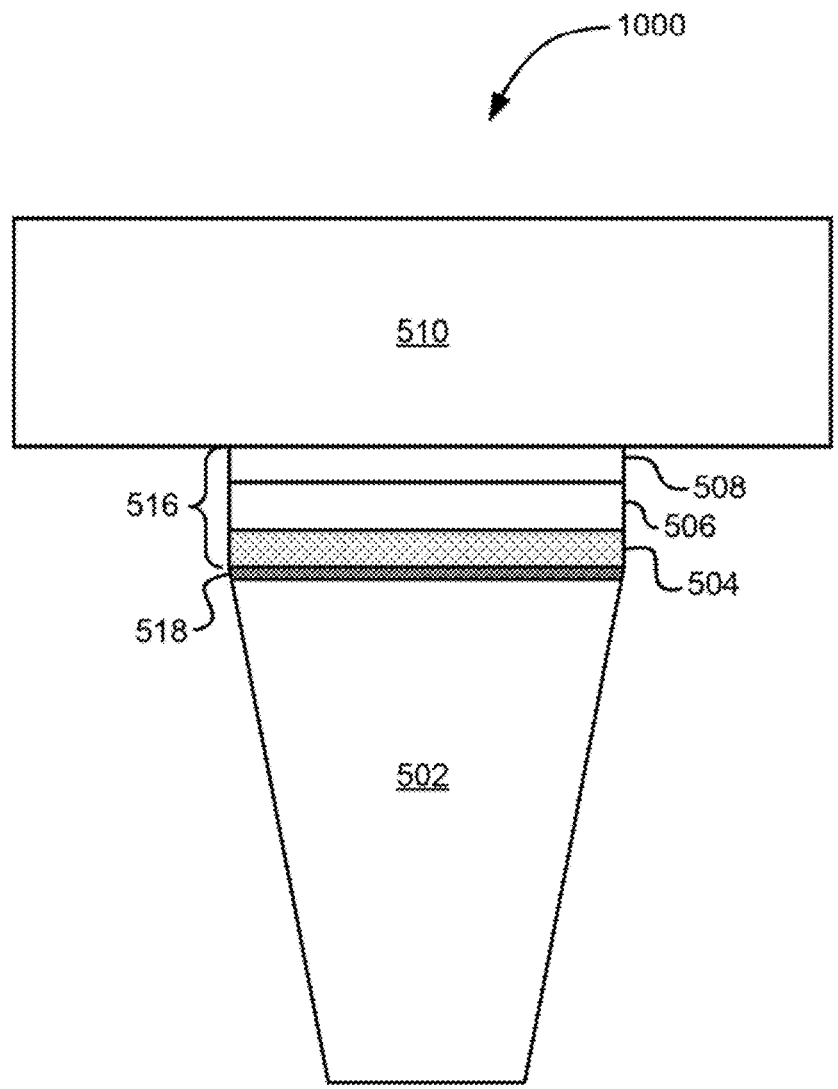
FIG. 10A shows an ABS view of one embodiment of a MAMR head.
Figure 10B:
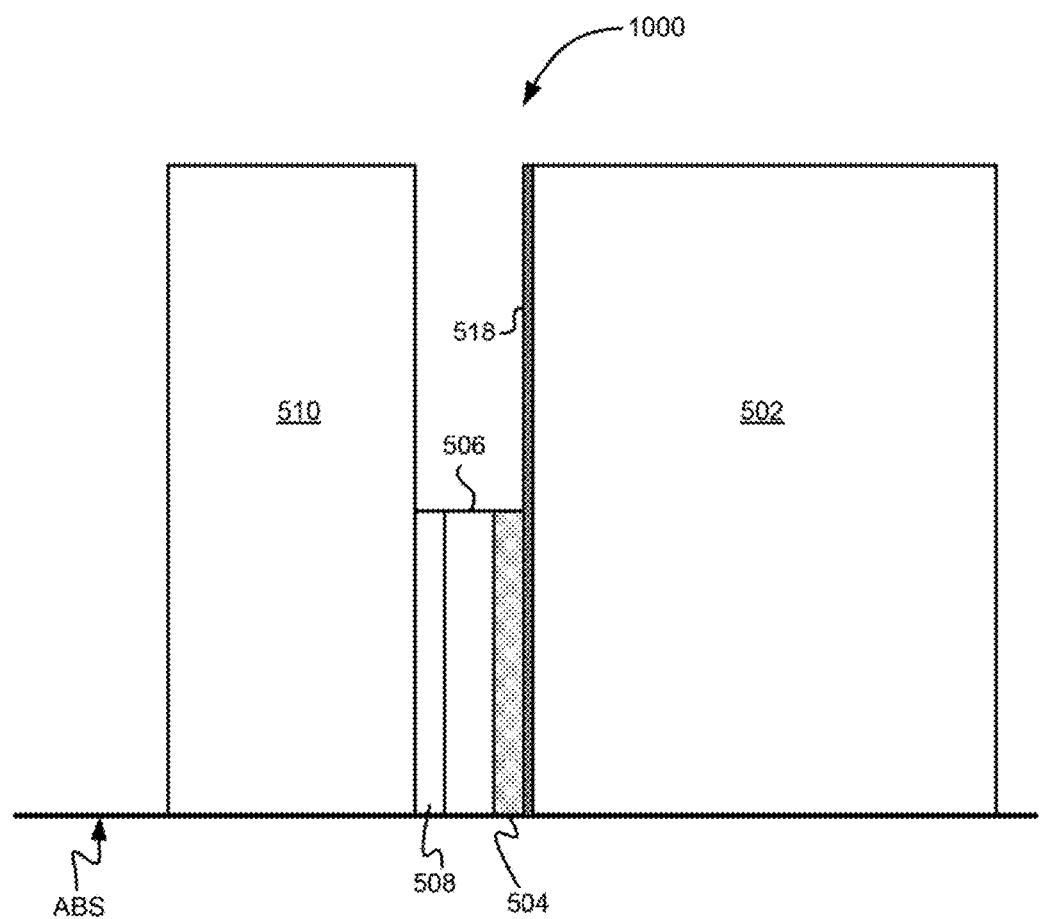
FIG. 10B shows a cross-sectional view of the MAMR head from FIG. 10A, according to one embodiment.

FIG. 10A shows an ABS view of a MAMR head 1000 according to another embodiment, while FIG. 10B shows a cross-sectional view of the MAMR head 1000. In this MAMR head 1000, a section 518 of the main pole 502 adjacent to the non-magnetic interlayer 504 is formed from a material of high spin polarization (highly-polarized material). What constitutes a highly-polarized material is that the material exhibits a high spin polarization of conduction electrons therein of greater than about 75%, such as up to about 100%. The employment of a highly-polarized material 518 results in an increase in the spin torque applied to the FGL 506 magnetization and, in turn, to improved oscillation efficient. In one embodiment, CoMnGe which forms a Heusler alloy may be employed as the highly-polarized material 518. In other embodiments, a CoMnSi Heusler alloy, CoCrAl Heusler alloy, or other similar material may be used. The highly-polarized material 518 need not possess magnetic anisotropy in the direction perpendicular to the film surface, but may in some approaches.

While these figures show a structure in which the entirety of the main pole 502 facing the gap between the main pole 502 and the tailing shield 510 is formed with a highly-polarized material 518, a section of the main pole 502 only adjacent to the non-magnetic interlayer 504 may alone be substituted with a highly-polarized material, in some approaches.

Figure 11A:
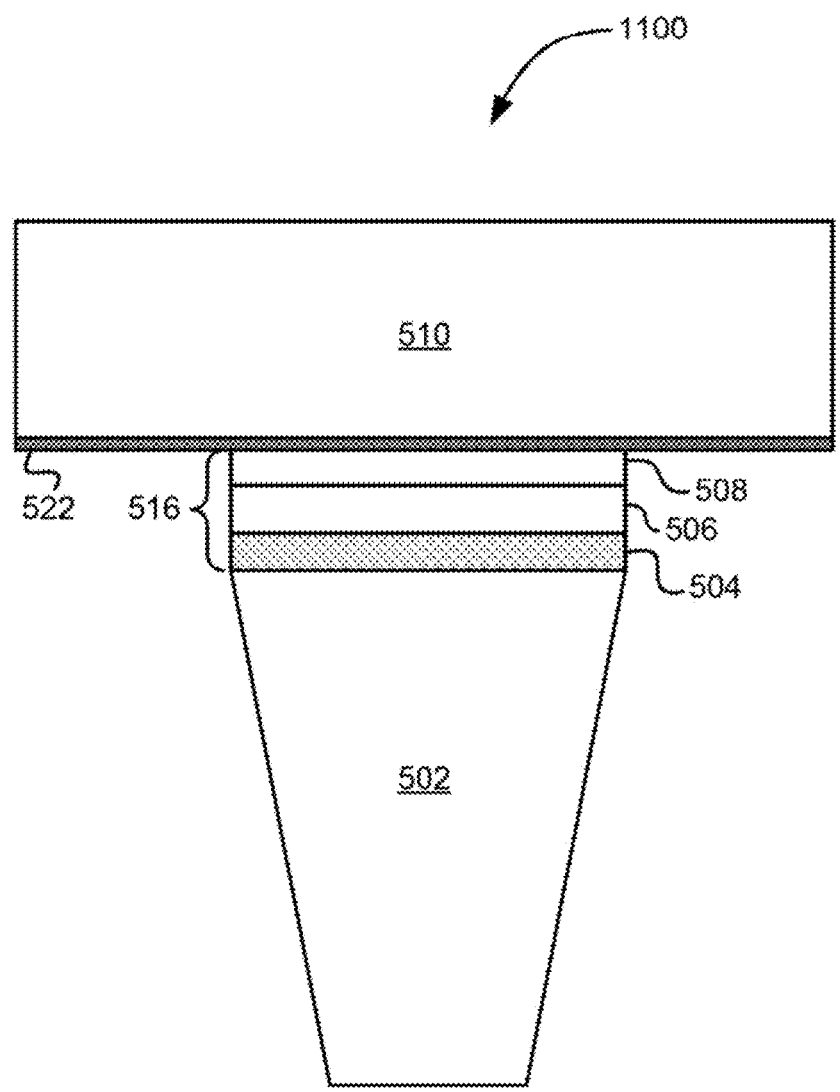
FIG. 11A shows an ABS view of one embodiment of a MAMR head.
Figure 11B:
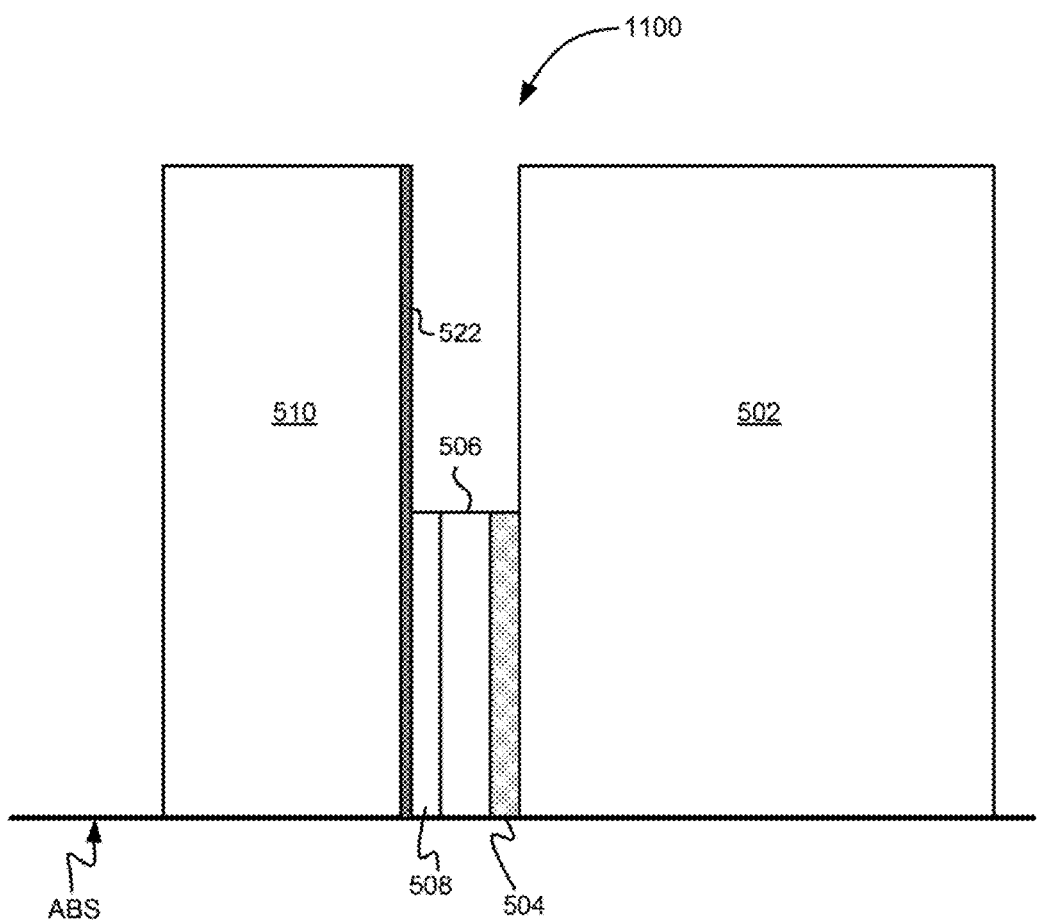
FIG. 11B shows a cross-sectional view of the MAMR head from FIG. 11A, according to one embodiment.

FIG. 11A shows an ABS view of a MAMR head 1100 according to another embodiment, while FIG. 11B shows a cross-sectional view of the MAMR head 1100. In this MAMR head 1100, a portion 522 of the trailing shield 510 adjacent to the non-magnetic interlayer 504 may be formed from a material of high spin polarization (highly-polarized material). In one embodiment, CoMnGe which comprises a Heusler alloy may be employed as the highly-polarized material. In more embodiments, a CoMnSi Heusler alloy, a CoCrAl Heusler alloy, or other similar alloys may be employed. The employment of a highly-polarized material affords an increase in the spin torque applied to the FGL 506 magnetization and, in turn, to improved oscillation efficiency.

While these figures show a structure in which the entirety of the trailing shield 510 facing the gap between the main pole 502 and the tailing shield 510 is formed with a highly-polarized material 522, a section of the trailing shield 510 only adjacent to the non-magnetic interlayer 504 may alone be substituted with a highly-polarized material, in some approaches.

Figure 12:
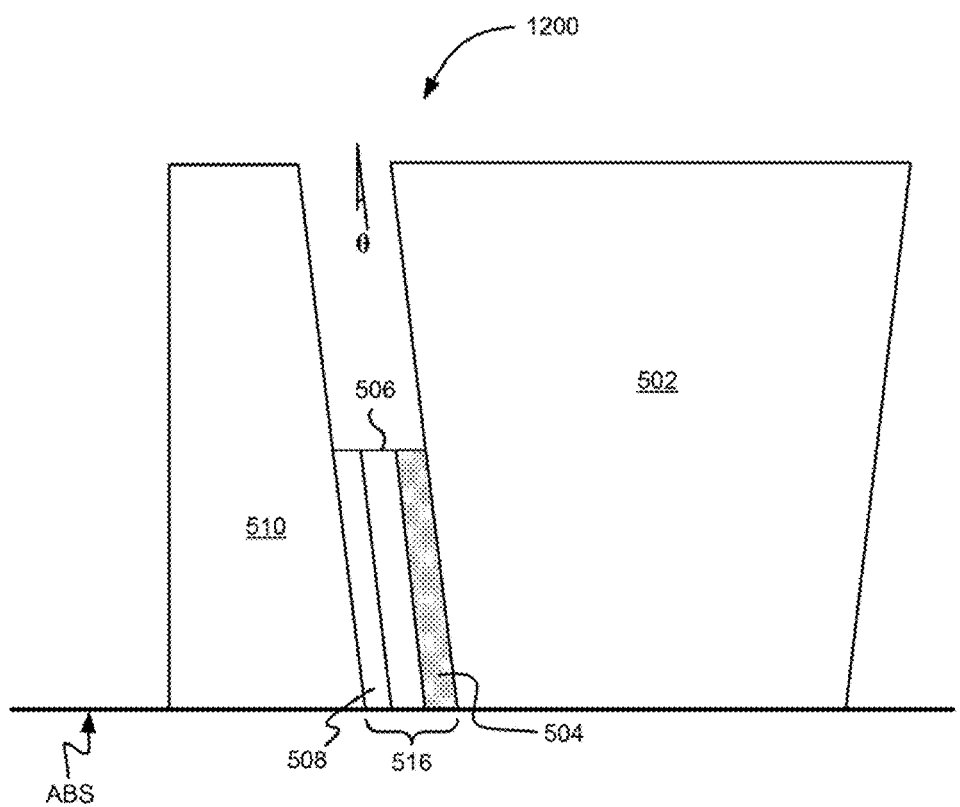
FIG. 12 shows a cross-sectional view of a MAMR head, according to one embodiment.

FIG. 12 shows another embodiment of a MAMR head 1200. This is a cross-sectional schematic diagram of a center portion of the main pole 502 in the cross-track direction.

As shown, the STO 516 may be fabricated on a tapered main pole 502. At this time, a stronger magnetic field intensity is able to be produced by tapering the main pole 502 to the trailing shield 510 side by an angle θ with respect to a direction normal to the ABS. The STO 516 may be configured according to any embodiment described herein. In addition, a portion of the main pole 502 or trailing shield 510 adjacent to the STO 516 may be substituted with a highly-polarized material, as described herein in other embodiments.

In addition, while FIG. 12 shows a main pole 502 structure in which the main pole 502 tapers at the leading side, the existence or otherwise of a taper at the leading side has no impact on the effects of the embodiments described herein.

Figure 13:
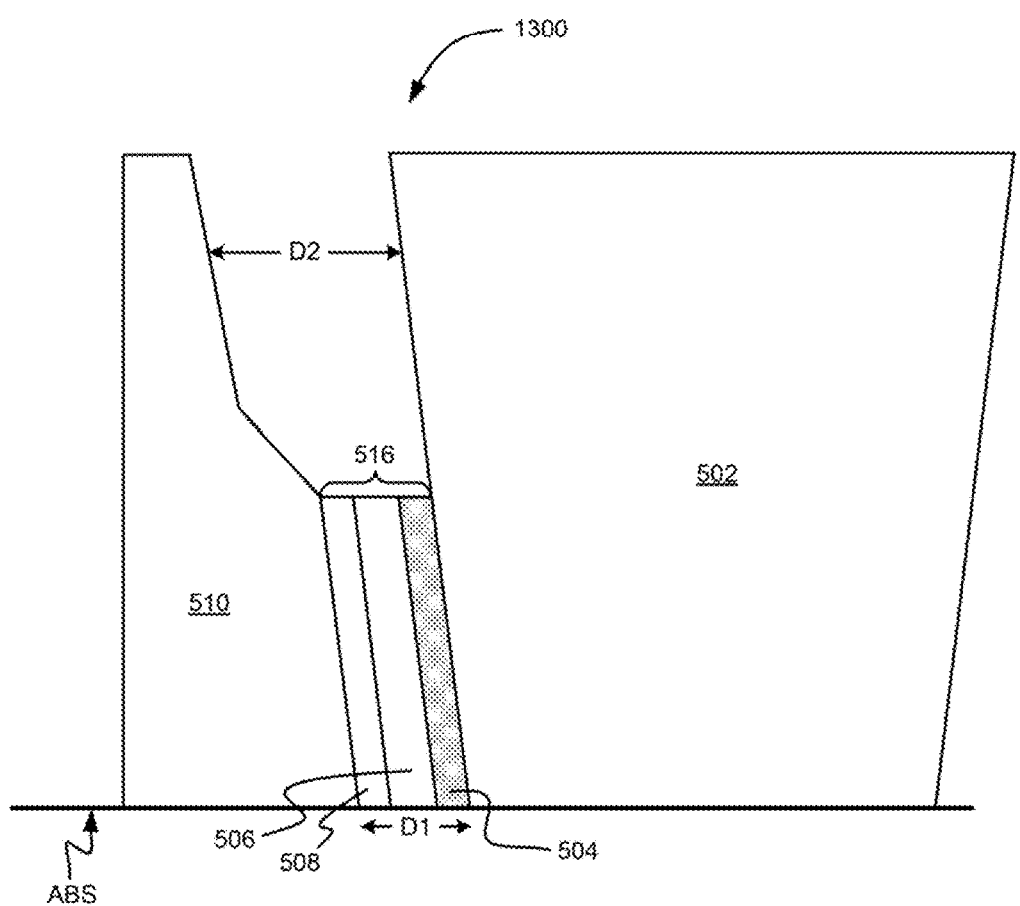
FIG. 13 shows a cross-sectional view of a MAMR head, according to one embodiment.

FIG. 13 shows a MAMR head 1300 according to another embodiment. This is a cross-sectional schematic diagram of a center portion of the main pole 502 in the cross-track direction. In this embodiment, the distance D2 between the main pole 502 and the trailing shield 510 beyond the rear edge of the STO 516 is greater than the distance D1 between the main pole 502 and the trailing shield 510 at the ABS. The advantage of the structure of this embodiment resides in the fact that, because the flux amount that flows directly from the main pole 502 to the trailing shield 510 decreases beyond the rear edge of the STO 516, the intensity of the magnetic field applied to the medium and the STO 516 is increased.

The STO 516 may be configured according to any embodiment described herein. In addition, while FIG. 13 shows a main pole 502 structure in which the main pole 502 tapers at the leading side, the existence or otherwise of a taper at the leading side has no impact on the effects of the embodiments described herein.

Any of the MAMR heads described herein according to various embodiments may be included in a magnetic data storage system. In this case, the magnetic data storage system may further comprise a magnetic medium, a drive mechanism for passing the magnetic medium over the at least one magnetic head, and a controller electrically coupled to the at least one magnetic head for controlling operation of the at least one magnetic head, such as those described in FIG. 1.

Figure 14:
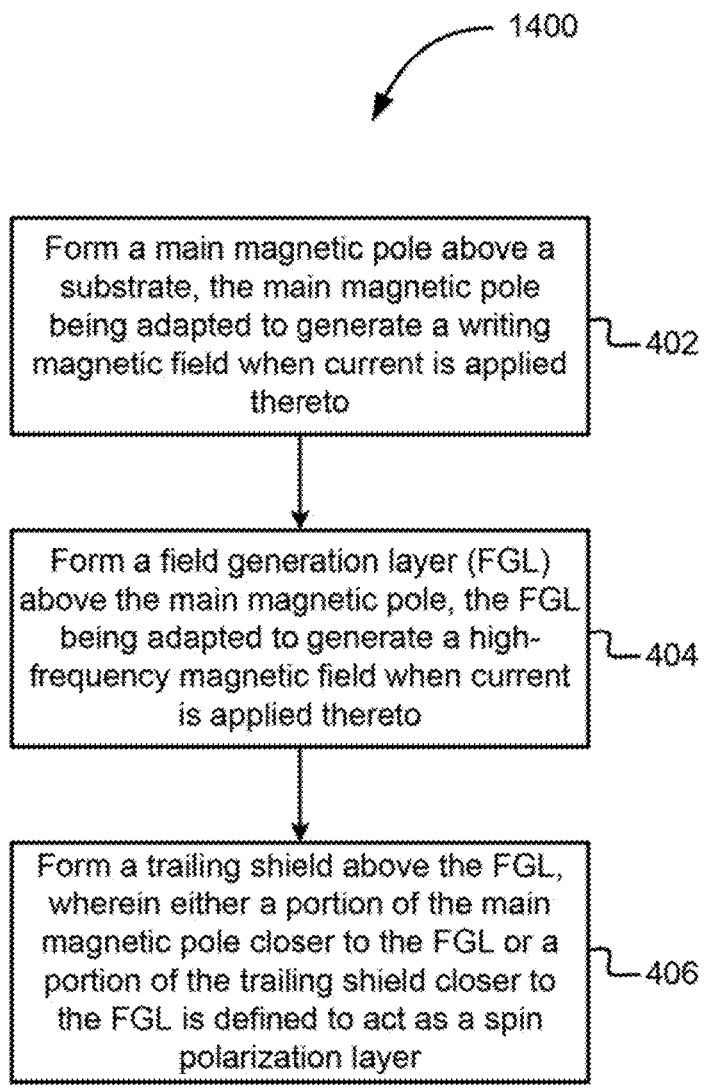
FIG. 14 shows a flowchart of a method for forming a MAMR head, according to one embodiment.

FIG. 14 shows a method 1400 for forming a MAMR head in accordance with one embodiment. As an option, the present method 1400 may be implemented to construct structures such as those shown in FIGS. 1-13. Of course, however, this method 1400 and others presented herein may be used to form magnetic structures for a wide variety of devices and/or purposes which may or may not be related to magnetic recording. Further, the methods presented herein may be carried out in any desired environment. It should also be noted that any aforementioned features may be used in any of the embodiments described in accordance with the various methods.

In operation 1402, a main magnetic pole is formed above a substrate, the main magnetic pole being adapted to generate a writing magnetic field when current is applied to a write coil. Any formation technique or combination of techniques may be used to form the main magnetic pole, such as sputtering, plating, atomic layer deposition (ALD), etc. The substrate may be separated from the main magnetic pole by any number of layers, as known in the art.

In operation 1404, a FGL is formed above the main magnetic pole, the FGL being adapted to generate a high-frequency magnetic field when current is applied thereto. In one embodiment, a spacer layer may be formed between the main magnetic pole and the FGL at the ABS. In another embodiment, a non-magnetic interlayer may be formed between the main magnetic pole and the FGL at the ABS.

In operation 1406, a trailing shield is formed above the FGL. In one embodiment, a cap layer may be formed between the trailing shield and the FGL at the ABS. In another embodiment, a non-magnetic interlayer may be formed between the trailing shield and the FGL at the ABS. The cap layer may comprise a non-magnetic material in one approach.

In method 1400, either a portion of the main magnetic pole closer to the FGL or a portion of the trailing shield closer to the FGL may be defined to act as a spin polarization layer.

In one embodiment, the portion of the main magnetic closest to the FGL may be adapted to act as the spin polarization layer. This portion may be in contact with the interlayer and may comprise a highly-polarized material.

In another embodiment, the portion of the trailing shield closest to the FGL may be adapted to act as the spin polarization layer. This portion may be in contact with the interlayer and may comprise a highly-polarized material.

In any embodiment, a magnetic rotation guide layer may be formed in place of a cap layer and/or a spacer layer.

In another embodiment, a surface of the main magnetic pole on a trailing shield-facing side thereof and a surface of the trailing shield on a main magnetic pole-facing side thereof may be formed at an angle with respect to a direction normal to the ABS. In addition, the FGL may be formed at the angle according to the angled surface of the main magnetic pole and the angled surface of the trailing shield.

According to another embodiment, the method 1400 may further comprise forming a gap layer between the main magnetic pole and the trailing shield beyond a rear edge of the FGL in an element height direction thereof. In this embodiment, a gap distance in a direction parallel to the ABS between the trailing shield and the main magnetic pole at the ABS is less than a gap distance in the direction parallel to the ABS between the trailing shield and the main magnetic pole at a point beyond the rear edge of the FGL in the element height direction thereof.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A microwave-assisted magnetic recording (MAMR) head, comprising:
   a main magnetic pole adapted to generate a writing magnetic field when current is applied to a write coil;
   a trailing shield positioned, at an air bearing surface (ABS), in a trailing direction from the main magnetic pole;
   a field generation layer (FGL) positioned, at the ABS, between the main magnetic pole and the trailing shield; and
   an interlayer positioned, at the ABS, between the main magnetic pole and the FGL, wherein the interlayer comprises a non-magnetic material, and
   a cap layer positioned, at the ABS, between the FGL and the trailing shield, wherein the cap layer comprises a non-magnetic material,
   wherein either a portion of the main magnetic pole closer to the FGL or a portion of the trailing shield closer to the FGL is adapted to act as a spin polarization layer,
   wherein the portion of the main magnetic pole is configured to act as the spin polarization layer, and
   wherein the portion of the main magnetic pole configured to act as the spin polarization layer is in direct contact with the interlayer and comprises a highly-polarized material.

2. The MAMR head as recited in claim 1, wherein the highly-polarized material of the portion of the main magnetic pole configured to act as the spin polarization layer comprises at least one alloy selected from a group consisting of: CoMbGe, CoMnSi, and CoCrAl.

3. A magnetic data storage system, comprising:
   at least one MAMR head as recited in claim 1;
   a magnetic medium;
   a drive mechanism for passing the magnetic medium over the at least one magnetic head; and
   a controller electrically coupled to the at least one magnetic head for controlling operation of the at least one magnetic head.

4. A method for forming a microwave-assisted magnetic recording (MAMR) head, the method comprising:
   forming a main magnetic pole above a substrate, the main magnetic pole being adapted to generate a writing magnetic field when current is applied to a write coil;
   forming a field generation layer (FGL) above the main magnetic pole, the FGL being adapted to generate a high-frequency magnetic field when current is applied thereto;
   forming a trailing shield above the FGL; and
   forming an interlayer between the main magnetic pole and the FGL at an air bearing surface (ABS), wherein the interlayer comprises a non-magnetic material, and
   forming a cap layer between the FGL and the trailing shield at the ABS, wherein the cap layer comprises a non-magnetic material,
   wherein either a portion of the main magnetic pole closer to the FGL or a portion of the trailing shield closer to the FGL is defined to act as a spin polarization layer,
   wherein the portion of the main magnetic pole is configured to act as the spin polarization layer, and
   wherein the portion of the main magnetic pole configured to act as the spin polarization layer is in direct contact with the interlayer and comprises a highly-polarized material.

5. The method as recited in claim 4, wherein the highly-polarized material of the portion of the main magnetic pole configured to act as the spin polarization layer comprises at least one Heusler alloy selected from a group consisting of: CoMbGe, CoMnSi, and CoCrAl.

* * * * *